US011323871B2

(12) United States Patent
Vandervelde et al.

(10) Patent No.: US 11,323,871 B2
(45) Date of Patent: May 3, 2022

(54) METHOD AND APPARATUS OF A CONNECTION SETUP IN A WIRELESS COMMUNICATION SYSTEM

(71) Applicant: Samsung Electronics Co., Ltd., Suwon-si (KR)

(72) Inventors: Himke Vandervelde, Staines (GB); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/652,245

(22) PCT Filed: May 30, 2018

(86) PCT No.: PCT/KR2018/006164
§ 371 (c)(1),
(2) Date: Mar. 30, 2020

(87) PCT Pub. No.: WO2019/066190
PCT Pub. Date: Apr. 4, 2019

(65) Prior Publication Data
US 2020/0245131 A1 Jul. 30, 2020

(30) Foreign Application Priority Data

Sep. 28, 2017 (GB) .................... 1715723

(51) Int. Cl.
*H04W 8/24* (2009.01)
*H04W 76/10* (2018.01)

(52) U.S. Cl.
CPC ............. *H04W 8/24* (2013.01); *H04W 76/10* (2018.02)

(58) Field of Classification Search
CPC ........ H04W 8/24; H04W 76/10; H04W 76/12
(Continued)

(56) References Cited

U.S. PATENT DOCUMENTS

2006/0211425 A1  9/2006  Bae et al.
2014/0155056 A1* 6/2014  Jactat ................. H04W 24/08
                                                        455/422.1
(Continued)

FOREIGN PATENT DOCUMENTS

EP  2 070 381 A2  6/2009
EP  2 169 988 A1  3/2010
(Continued)

OTHER PUBLICATIONS

Ericsson: "UE capability "compression"", 3GPP Draft; R2-1708034—UE Capability Compression, 3rd Generation Partnership Project (3GPP), Mobile Competence Centre; 650, Route Des Lucioles ; F-06921 Sophia-Antipolis Cedex; France, vol. RAN WG2, No. Berlin, Germany; Aug. 21, 2017-Aug. 25, 2017, Aug. 20, 2017, XP051317944.

(Continued)

*Primary Examiner* — Congvan Tran
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating a user equipment, UE (10) in a wireless communication system, the method comprising: receiving, from a base station, BS (20), connection setup message requesting information on capabilities of the UE (10); transmitting, to the BS (20), the information on capabilities of the UE (10) is provided.

15 Claims, 4 Drawing Sheets

(58) Field of Classification Search
USPC .................................... 370/3–28, 329, 328
See application file for complete search history.

(56) References Cited

U.S. PATENT DOCUMENTS

| | | | | |
|---|---|---|---|---|
| 2015/0208456 | A1* | 7/2015 | Guo | H04W 76/14 |
| | | | | 455/426.1 |
| 2015/0319744 | A1 | 11/2015 | Jung et al. | |
| 2015/0327269 | A1 | 11/2015 | Kim et al. | |
| 2015/0334653 | A1 | 11/2015 | Ang et al. | |
| 2017/0215065 | A1* | 7/2017 | Vamanan | H04W 8/24 |
| 2017/0251478 | A1* | 8/2017 | Kim | H04W 72/0413 |
| 2018/0167814 | A1 | 6/2018 | Fujishiro et al. | |
| 2018/0270873 | A1* | 9/2018 | Cho | H04W 28/02 |
| 2019/0239067 | A1* | 8/2019 | Tokunaga | H04W 8/22 |
| 2019/0357065 | A1* | 11/2019 | Cho | H04W 36/30 |
| 2020/0112969 | A1* | 4/2020 | Dai | H04W 72/10 |
| 2020/0260264 | A1* | 8/2020 | Hapsari | H04W 8/22 |

FOREIGN PATENT DOCUMENTS

| | | |
|---|---|---|
| EP | 2 285 140 A2 | 2/2011 |
| EP | 3 188 568 A1 | 7/2017 |
| GB | 2458885 A | 10/2009 |
| GB | 2542770 A | 4/2017 |
| WO | 2008/043078 A2 | 4/2008 |
| WO | 2014/014326 A1 | 1/2014 |
| WO | 2014/084675 A1 | 6/2014 |
| WO | 2016140069 A1 | 9/2016 |
| WO | 2017/026442 A1 | 2/2017 |

OTHER PUBLICATIONS

Samsung: "NR UE capabilities, size reduction and simplification", 3GPP Draft; R2-1707210 On NR UE Capability Size and Complexity, 3rd Generation Partnership Project (3GPP), Mobile Competence Centre; 650, Route Des Lucioles ; F-06921 Sophia-Antipolis Cedex; France, vol. RAN WG2, No. Qingdao, China; Jun. 27, 2017-Jun. 29, 2017, Jun. 16, 2017 (Jun. 16, 2017), XP051306749.
Extended European Search Report dated Sep. 17, 2020, issued in European Application No. 18862732.7-1212.
3GPP TSG-RAN WG2#99 bis, R2-170xxxx, Prague, Czech Republic, Oct. 9-13, 2017, NR UE capabilities, identifier.
3GPP TSG-RAN WG2 NR Ad Hoc, R2-1707210, Qingdao, China, Jun. 27-29, 2017, NR UE capabilities, size reduction and simplification.
Great Britain Search and Examination Report dated Mar. 20, 2018, issued in Great Britain Application No. GB1715723.1.
SWG Traffic, Working Document Towards a Preliminary Draft New Report ITU-R M.[IMT. BEYOND2020.TRAFFIC], IMT Traffic estimates beyond year 2020, Oct. 21, 2014.
Recommendation ITU-R M.2083-0 (Sep. 2015), IMT Vision—Framework and overall objectives of the future development of IMT for 2020 and beyond, M Series, Mobile, radiodetermination, amateur and related.
Report ITU-R M.2320-0 (Nov. 2014), Future technology trends of terrestrial IMT systems, M Series, Mobile, radiodetermination, amateur and related satellite services.
European Office Action dated Sep. 28, 2021, issued in European Application No. 18862732.7.
United Kingdom Office Action dated Nov. 12, 2021, issued in United Kingdom Application No. GB1715723.1.

* cited by examiner

[Fig. 1]
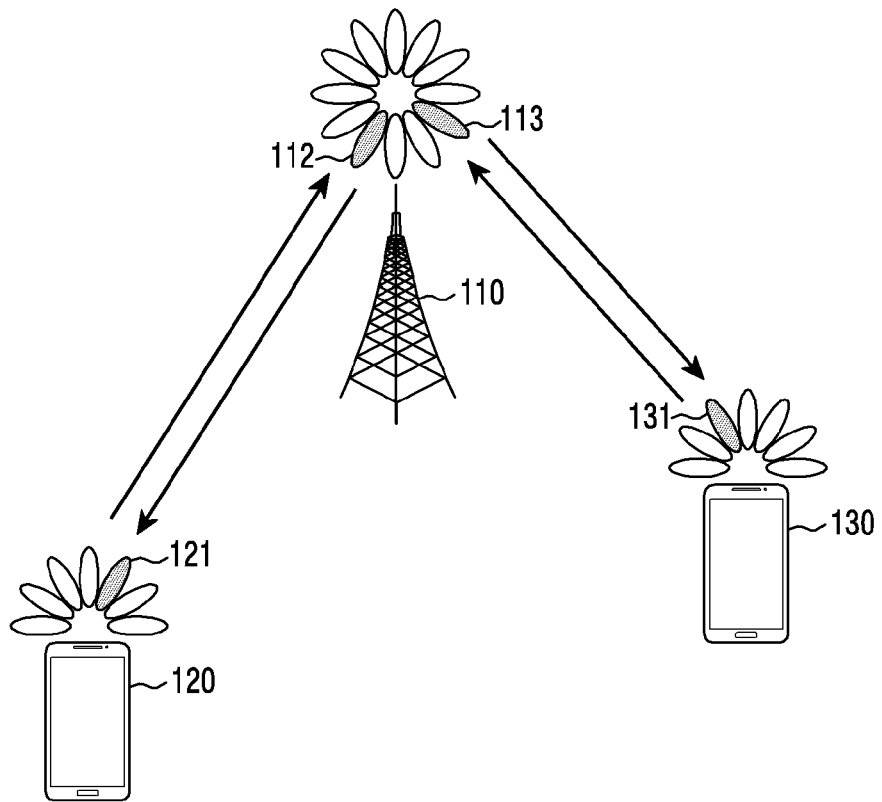
[Fig. 2]
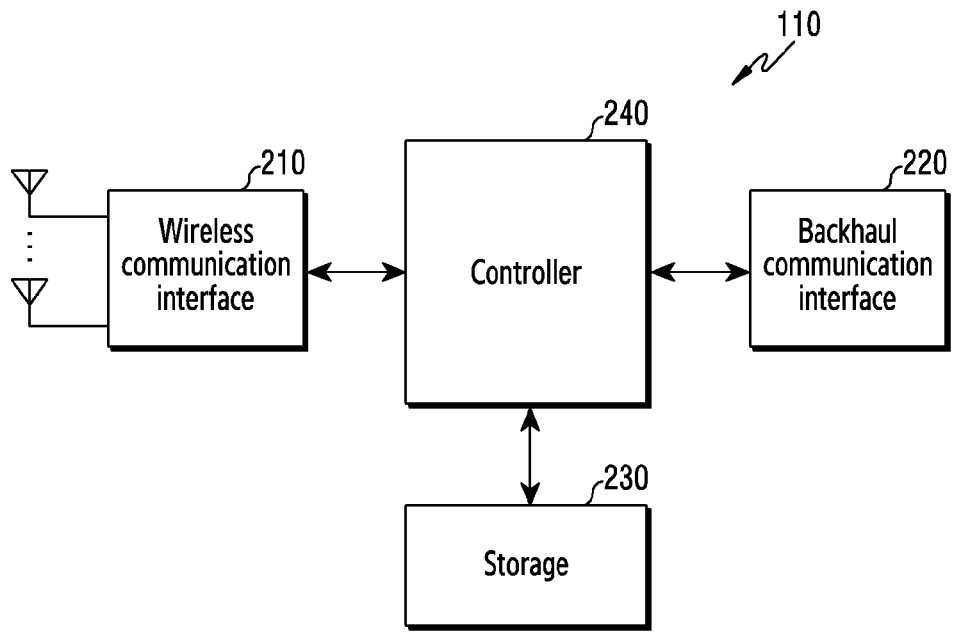

[Fig. 3]
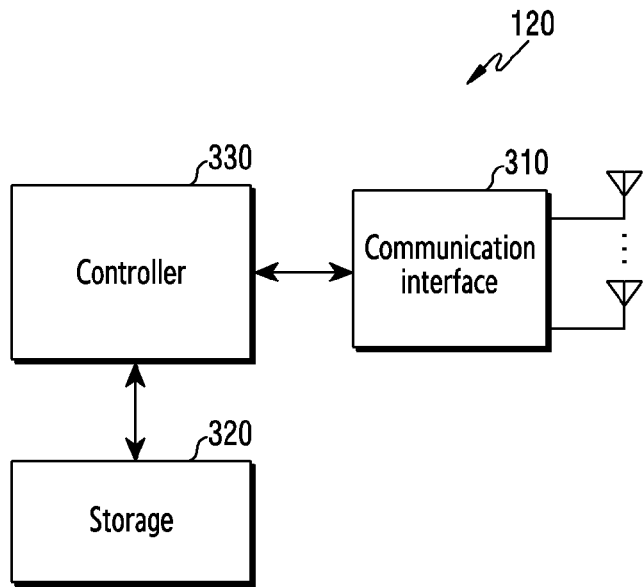
[Fig. 4]
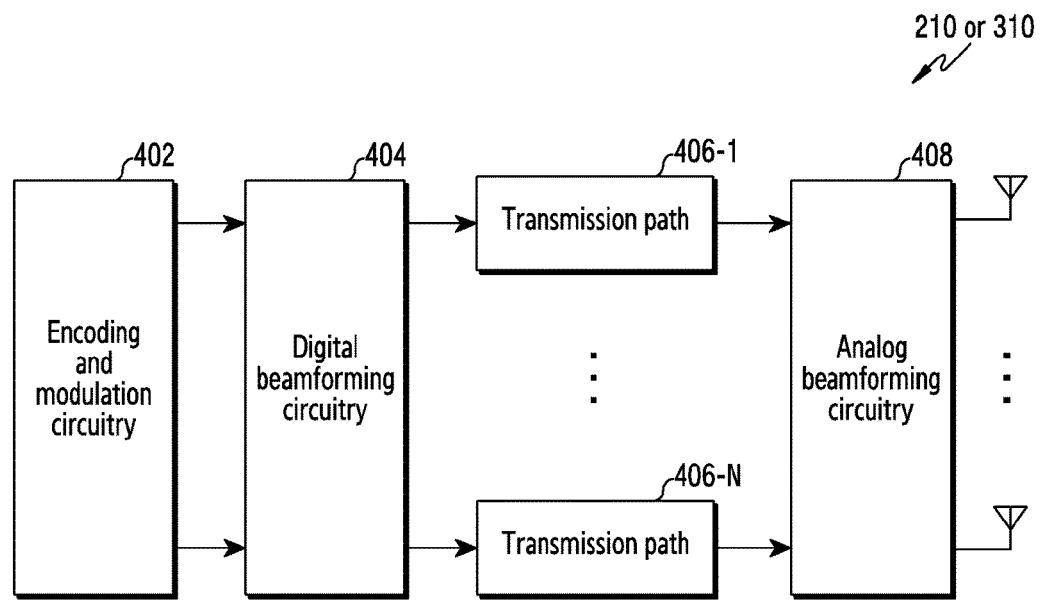

[Fig. 5]
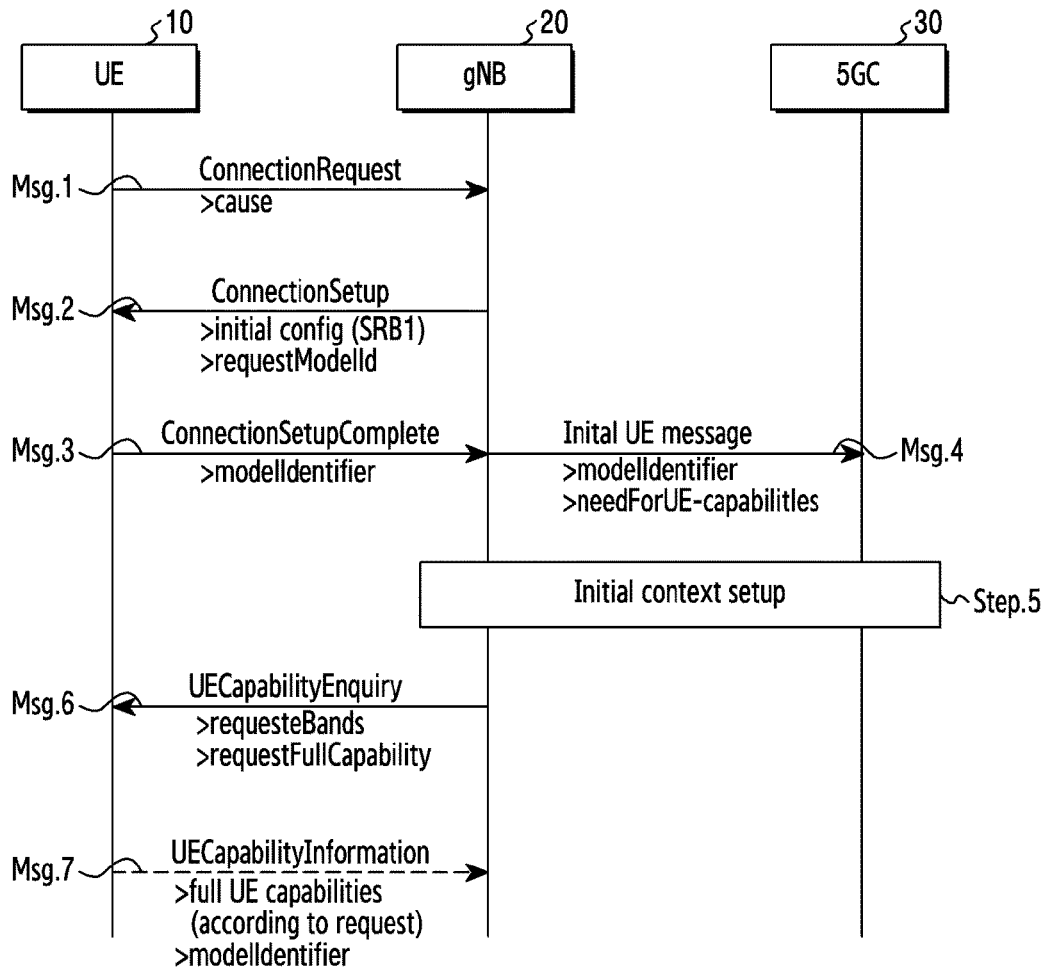
[Fig. 6]
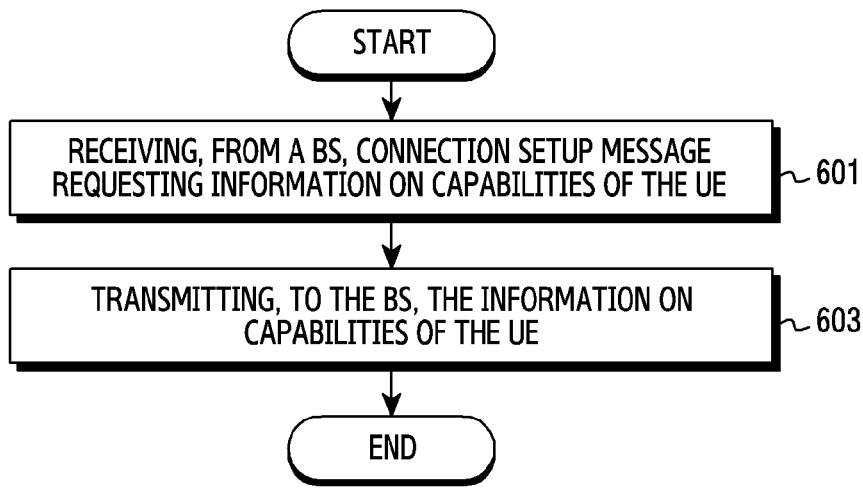

[Fig. 7]
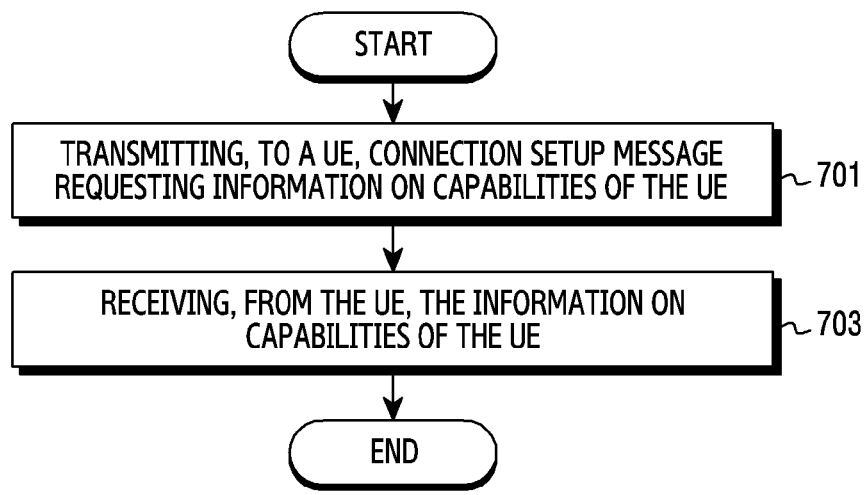

METHOD AND APPARATUS OF A CONNECTION SETUP IN A WIRELESS COMMUNICATION SYSTEM

TECHNICAL FIELD

The present disclosure relates to connection set up in a telecommunication system. It particularly relates to the provision to the network of information relating to the capabilities of a particular device or User Equipment (UE).

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

A problem with providing such capability information after connection setup is that it can delay the proper or optimum configuration of the UE at the time of initially attaching to the network. This can have adverse effects in terms of optimal performance and can unnecessarily inhibit data throughput, for instance.

It is an aim of embodiments of the invention to address shortcomings and problems in the prior art, whether identified herein or not.

Solution to Problem

According to various embodiments of the present disclosure, a method for operating a user equipment, UE (10) in a wireless communication system is provided. The method comprises: receiving, from a base station, BS (20), connection setup message requesting information on capabilities of the UE (10); and transmitting, to the BS (20), the information on capabilities of the UE (10).

According to various embodiments of the present disclosure, a method for operating a base station, BS (20) in a wireless communication system is provided. The method comprises: transmitting, to a user equipment, UE (10), connection setup message requesting information on capabilities of the UE (10); and receiving, from the UE (10), the information on capabilities of the UE (10).

According to various embodiments of the present disclosure, a user equipment, UE (10) in a wireless communication system is provided. The UE comprises: a transceiver; and at least one processor coupled to the transceiver, and configured to: receive, from a base station, BS (20), connection setup message requesting information on capabilities of the UE (10); and transmit, to the BS (20), the information on capabilities of the UE (10).

Although a few preferred embodiments of the present disclosure have been shown and described, it will be appreciated by those skilled in the art that various changes and modifications might be made without departing from the scope of the invention, as defined in the appended claims.

Advantageous Effects of Invention

A method and an apparatus for improving in and relating to connection setup is provided.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 shows a message exchange according to an embodiment of the present disclosure;

FIG. 6 is a flowchart for operation of a UE according to various embodiments of the present disclosure; and FIG. 7 is a flowchart for operation of a base station according to various embodiments of the present disclosure.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a grant-free data transmission in a wireless communication system.

The terms referring to grant-free, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

With rapid development of information industry, especially increasing requirements from mobile Internet and Internet of things (IoT), mobile communication techniques are facing unprecedented challenges. According to International Telecommunication Union (ITU) report ITU-R M.[IMT.BEYOND 2020.TRAFFIC], it can be predicted that as of 2020, mobile service amount will increase 1000 times compared with that in 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description including requirement prospect, application scenarios and various important performances of 5G. With respect to new requirements of 5G, the ITU report ITU-R M.[IMT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

The requirement of supporting massive machine-type communication (mMTC) is proposed in 5G, there will be millions of connections per square meter, which is far higher than the current connection density supported by the current standards. The service requirements of the large amount of connections may lead to high cost of original communication procedure of LTE, especially for the schedule-based data transmission such as random access, scheduling request. This may lead to a signaling storm and a large part of bandwidth may be used for transmitting signaling instead of data, which greatly decreases the spectrum efficiency and effectiveness of the system and also increases power consumption of the UE. This goes against to the requirement of power consumption in mMTC services.

In addition, ultra-reliable low-latency communication (URLLC) proposed in 5G has requirements on both latency and reliability. It requires an end-to-end latency less than 1 ms and a block error rate lower than 10-5. It also gives challenges to the conventional LTE communication procedures. For example, although the conventional schedule-based communication procedure is able to decrease block error rate of data transmission by decreasing code rate, increasing bandwidth or time-domain repeating, the complicated scheduling in the conventional LTE communication procedure will increase the data transmission delay, which is unfavorable for meeting the latency requirement of the URLLC scenario.

Grant-free transmission is able to solve the signaling cost and delay problem caused by the schedule-based transmission. However, no matter whether UEs randomly select resources or a resource allocation manner based on semi-persistent scheduling is adopted, there inevitably exists UE conflict. Therefore, for the grant-free transmission, it is a problem to be solved in the standardization of 5G that how to tradeoff between transmission reliability and resource utilization ratio, and transmission reliability and transmission delay.

At present, there may be two solutions for implementing the grant-free transmission.

1. The base station configures a resource pool used for the grant-free transmission. When a UE has data to be transmitted, the UE randomly selects a resource for the grant-free transmission to implement uplink data transmission. The resources include at least one of: time resources, multiple access signatures, uplink demodulation reference signals.

2. The base station allocates resources for grant-free transmission for UEs adopting grant-free transmission. The resources include at least one of: time-frequency resources, multiple access signatures, uplink demodulation reference signals, when a UE needs to transmit data using the grant-free mode, the UE transmits using the resources allocated by the base station.

In the foregoing description, the time-frequency resources refer to those specially allocated for the grant-free transmission. The multiple access signatures refer to the orthogonal or non-orthogonal divided multiple access signatures, including but not limited to: orthogonal time-frequency resources, orthogonal code sequences, code books, interleave sequences, scrambling sequences, etc.

In the above two grant-free transmission manners, if the first manner is adopted to implement the grant-free transmission, the UE may operate in a connected mode (i.e. a random access procedure is completed) or a non-connected mode. Since multiple UEs select resources from the same resource pool with the same probability, collide inevitably happens to the uplink transmissions of the UEs, i.e., the multiple UEs select the same resources for the uplink data transmission. The resources include at least one of: time-frequency resources, multiple access signatures, uplink demodulation reference signals, which may degrade the reliability of the data transmission. If the second grant-free transmission manner is adopted, the base station may control the number of UEs whose data may collide through control the number of UEs allocated with the same resources, the resources include at least one of: time-frequency resources, multiple access signatures, uplink demodulation reference signals, which increases the reliability of the data transmission at a price of spectrum efficiency and resource utilization ratio.

It can be seen that, in the conventional grant-free transmission manners, the first manner may degrade the reliability of the data transmission. The second manner may decrease the spectrum efficiency and spectrum utilization ratio. Thus, the convention grant-free transmission cannot reach a balance between the data transmission reliability and spectrum utilization ratio.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by de-modulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit resource allocation information for grant-free transmission, receive uplink data from a terminal on grant-free transmission resources, if a dedicate resource request indicator is received from the terminal, allocate dedicated resources for the terminal, and indicating dedicated resource allocation information to the terminal, and receive subsequent uplink data of the terminal on the dedicated resources. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", -unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 re-constructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive resource allocation information for a grant-free transmission from a base station, transmit uplink data using grant-free transmission resources according to the resource allocation information to the base station, if the transmission of the uplink data cannot be completed within a predefined number of uplink data transmissions, transmit a dedicated resource request indicator to the base station, receive dedicated resource allocation information from the base station, and transmit subsequent uplink data on dedicated resources corresponding to the dedicated resource allocation information to the base station. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In prior art telecommunication systems, the network usually requests a UE to provide certain information regarding its capabilities only when required and usually after setup has taken place. In the context of this application, the term capabilities is intended to include certain technical capabilities of the UE, including, but not limited to, bandwidth, MIMO layers, Bands or Band Combinations, Dual Connectivity.

Typically, in the prior art, the capabilities of any particular UE are stored within the network, specifically in the RAN node while the UE has a radio connection to this node and within the Core Network (CN), even while the UE is e.g. in idle and not in an active connection. When the UE first attaches to the CN, the capability information is stored so that when the UE connects at a later time, the CH can provide the capability information to the RAN node upon connection setup. As such, if such information is needed by the network e.g. when the UE first attaches, it must be specifically requested from the UE as needed.

In an embodiment of the invention, at connection setup, the UE identifies itself to the network using the prior art identifiers, which relate to its specific identity, but also by providing information regarding its model i.e. the particular device, manufactured by a particular manufacturer. Such a model identifier may provide a great deal of information regarding the capabilities of the UE in question, without requiring each capability to be provided explicitly.

The degree of granularity provided can be made as fine as is required. For example manufacturer X manufactures model Y in different variants A, B and C (where A, B and C have different capabilities), then the particular variant A, B or C can be identified to the network, meaning that the UE can be setup using the full range of its capabilities, without the network having to request specific information from the UE.

The network maintains a database of at least some UEs which are commonly used, so that it is able to cross-refer the UE which is attempting setup with the database, based on the model identifier, so that the UE can be configured optimally.

The database can be provided centrally in the network and populated with information provided by the manufacturers or network operators. It may contain details of the most popular UEs in use e.g. the ten or twenty most commonly used devices. The capability information included in the database may alternatively or additionally be populated on the basis of occasional demands of UEs to provide their full capability information in response to a request from the network.

In the event that a UE provides a model identifier not known to the network, then the network requests the UE to provide capability information in the usual way, as known in the prior art. However, the UE may also provide the model identifier so that the network can then relate the model identifier with the capability information provided. In this way, the network is able to build a database of capability information to be associated with particular model identifiers.

FIG. 5 illustrates an exemplary message exchange according to an embodiment of the present disclosure. The UE 10 is in communication with the base station, gNB 20 which, in turn is in communication with the Core Network, 5GC 30.

Message 1 is transmitted from UE 10 to gNB 20 and comprises a connection request, as known from the prior art.

Message 2 is transmitted from the gNB 20 to the UE 10 and comprises a connection setup message, as known from the prior art. Message 2 may additionally include a field, requestModelId, by which the network can control whether the UE should include the model identifier in Message 3.

Message 3 is transmitted from the UE 10 to the gNB 20 and may comprise the model identifier information, which identifies the type of UE including at least one of manufacturer, model and variant information, from which capability information can be inferred.

Message 4 is transmitted from the gNB 20 to the core network 30 and comprises the model identifier information received from the UE 10. Additionally, the message includes 'needForUE-capabilities' which indicates to the core network 30 that the gNB is aware of the capabilities of the UE, represented by the model identifier and, as such, the core network does not need to provide the corresponding UE capabilities during step 5—context set up. Message 4 also includes the model identifier.

If the gNB 20 does not have the UE capabilities corresponding to those identified from the model identifier, it may still provide model identifier information to the core network 30, since this may still be useful to the core network 30 even if, for instance, the UE has not attached before, the core network 30 may still have the relevant capabilities and can thus provide these during context setup.

Initial context setup is performed at step 5.

Message 6 is transmitted from the gNB 20 to UE 10 includes a request for the UE 10 to provide full capabilities information. This would only be required in the event that neither the gNB 20 or core network 30 has the UE capabilities represented by the model identifier information provided by UE 10.

Message 7, if required, is sent from the UE to the gNB and includes full capability information, as well as the model identifier.

In the foregoing, it is assumed that model identifier is able to represent certain capabilities of the UE 10. This could e.g. be a subset of the capabilities for one particular Radio Access Technology supported by the UE, the entire capabilities for one particular Radio Access Technology supported by the UE or the capabilities for multiple or all Radio Access Technologies supported by the UE.

The model identifier may take the form of a string which could be an identifier similar to IMEI or it could be a number from a hash over the UE capabilities represented.

In the former case, the IMEI includes a field known as Type Allocation Code (TAC) which includes information partly allocated by an authorised body and a second part allocated by a manufacturer. The model identifier may be set up similarly, with a first part assigned by some authority such as a standards body and a second part allocated by a particular manufacturer. In this way, each model can be uniquely identified using relatively few bits.

It may be that the UE indicates that some of its capabilities are temporarily not available for use by the RAN node i.e. are temporarily suspended. The model identifier is however assumed to represent the entire UE capabilities i.e. as applicable when none have been temporarily suspended. Other use cases are, however, not precluded.

Embodiments of the invention are particularly applicable to New Radio (i.e. 5th Generation) system and may also find application in earlier systems, such as LTE. However, embodiments of the invention are not limited to any particular radio access technology and may be used in any suitable system.

Advantageously, embodiments of the present disclosure allow earlier availability of UE capabilities, which can allow the UE to be optimally set up at the outset.

By making use of model identifier information, it is possible to provide centrally at a point (or points) in the network, information on certain more popular UEs which commonly access the network. Such information being available in this way lessens the information which must be provided by the UE on connection setup, since much of it will be common to a particular type of device and so does not need to be sent by each UE to the network at setup.

The overhead involved in providing such a capability in the network is relatively low cost, since the additional messaging overhead of the exchange exemplified in FIG. 5 results, overall, in less data traffic than if each UE provides full capability information individually. Furthermore, embodiments of the invention reduce capability storage in the RAN and the CH. Also, UE capabilities may be known earlier to the RAN and any such capabilities may therefore be used earlier upon connection setup.

FIG. 6 is a flowchart for operation of the user equipment according to various embodiments of the present disclosure.

Referring to FIG. 6, in step 601, the user equipment receives, from a base station, connection setup message requesting information on capabilities of the user equipment. The information on the capabilities of the user equipment may include a field, requestModelId. The information on the capabilities of the user equipment may be in a form of a model identifier. The model identifier may be information regarding a particular model of the user equipment. The model identifier may correspond to capability information of a device with the model identifier in a data base. The database may be maintained by a network connecting to the base station.

In step 603, the user equipment transmits, to the base station, the information on capabilities of the user equipment. The information may comprise the model identifier information, which identifies the type of user equipment including at least one of manufacturer, model and variant information, from which capability information can be inferred.

In some embodiments, after step 603, the user equipment may receive, from the base station, inquiry message requesting information on full capabilities of the user equipment when capability information of a device with the model identifier is not present in a data base; and may transmit, to the base station, the information on full capabilities of the user equipment.

FIG. 7 is a flowchart for operation of a base station according to various embodiments of the present disclosure.

Referring to FIG. 7, in step 701, the base station may transmit, to a user equipment, connection setup message requesting information on capabilities of the user equipment. The information on the capabilities of the user equipment may include a field, requestModelId. The information on the capabilities of the user equipment may be in a form of a model identifier. The model identifier may be information regarding a particular model of the user equipment. The model identifier may correspond to capability information of a device with the model identifier in a data base. The database may be maintained by a network connecting to the base station.

In step 703, the base station receives, from the user equipment, the information on capabilities of the user equipment. The information may comprise the model identifier information, which identifies the type of user equipment including at least one of manufacturer, model and variant information, from which capability information can be inferred.

In some embodiments, after step 703, the base station may transmit, to the user equipment, inquiry message requesting information on full capabilities of the user equipment when capability information of a device with the model identifier is not present in a data base; and receives, from the user equipment, the information on full capabilities of the user equipment.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a user equipment (UE) in a wireless communication system, the method comprising:
   receiving, from a base station (BS), a connection setup message requesting information on capabilities of the UE; and
   transmitting, to the BS, the information on the capabilities of the UE,
   wherein the information on the capabilities of the UE is in a form of a model identifier or full capabilities of the UE based on whether the connection setup message includes a field for a request of the model identifier,
   wherein the model identifier identifies a type of the UE including a manufacturer or a model of the UE, and
   wherein the model identifier corresponds to information of a subset of capabilities of the UE for one or more particular radio access technologies (RATs) among a plurality of RATs supported by the UE.

2. The method of claim 1, wherein the model identifier is information regarding a particular model of the UE.

3. The method of claim 1, wherein the model identifier corresponds to capability information of a device with the model identifier in a database.

4. The method of claim 1, further comprising:
   receiving, from the BS, an inquiry message requesting information on the full capabilities of the UE when capability information of a device with the model identifier is not present in a database; and
   transmitting, to the BS, the information on the full capabilities of the UE.

5. The method of claim 4, wherein the database is maintained by a network connecting to the BS.

6. A method for operating a base station (BS) in a wireless communication system, the method comprising:
   transmitting, to a user equipment (UE), a connection setup message requesting information on capabilities of the UE; and
   receiving, from the UE, the information on the capabilities of the UE,
   wherein the information on the capabilities of the UE is in a form of a model identifier or full capabilities of the UE based on whether the connection setup message includes a field for a request of the model identifier, and
   wherein the model identifier corresponds to information of a subset of capabilities of the UE for one or more particular radio access technologies (RATs) among a plurality of RATs supported by the UE.

7. The method of claim 6, wherein the model identifier is information regarding a particular model of the UE.

8. The method of claim 6, wherein the model identifier corresponds to capability information of a device with the model identifier in a database.

9. The method of claim 6, further comprising:
   transmitting, to the UE, an inquiry message requesting information on the full capabilities of the UE when capability information of a device with the model identifier is not present in a database; and
   receiving, from the UE, the information on the full capabilities of the UE.

10. The method of claim 9, wherein the database is maintained by a network connecting to the BS.

11. A user equipment (UE) in a wireless communication system, the UE comprising:
   a transceiver; and
   at least one processor coupled to the transceiver, and configured to:
      receive, from a base station (BS), a connection setup message requesting information on capabilities of the UE, and
      transmit, to the BS, the information on the capabilities of the UE,
   wherein the information on the capabilities of the UE is in a form of a model identifier or full capabilities of the UE based on whether the connection setup message includes a field for a request of the model identifier, and wherein the model identifier corresponds to information of a subset of capabilities of the UE for one or more particular radio access technologies (RATs) among a plurality of RATs supported by the UE.

12. The UE of claim 11, wherein the model identifier is information regarding a particular model of the UE.

13. The UE of claim 11, wherein the at least one processor is further configured to:

receive, from the BS, an inquiry message requesting information on the full capabilities of the UE when capability information of a device with the model identifier is not present in a database; and transmit, to the BS, the information on the full capabilities of the UE.

14. The UE of claim 11, wherein the model identifier corresponds to capability information of a device with the model identifier in a database.

15. The UE of claim 13, wherein the database is maintained by a network connecting to the BS.

\* \* \* \* \*